Nov. 6, 1962    J. W. GUY ETAL    3,062,369
LEAK-PROOF VARIABLE-VOLUME HOLDER FOR FROZEN CONFECTIONS
Filed Aug. 30, 1960    2 Sheets-Sheet 1

INVENTORS
James W. Guy &
Duel R. Ballard,
BY
ATTORNEY

Nov. 6, 1962 J. W. GUY ETAL 3,062,369
LEAK-PROOF VARIABLE-VOLUME HOLDER FOR FROZEN CONFECTIONS
Filed Aug. 30, 1960 2 Sheets-Sheet 2

INVENTORS
James W. Guy &
Duel R. Ballard,
BY
ATTORNEY

United States Patent Office 3,062,369
Patented Nov. 6, 1962

3,062,369
LEAK-PROOF VARIABLE-VOLUME HOLDER FOR FROZEN CONFECTIONS
James W. Guy, Glenview, Ill., and Duel R. Ballard, Alexandria, Va., assignors to Esber E. Moubayed, Washington, D.C.
Filed Aug. 30, 1960, Ser. No. 52,848
2 Claims. (Cl. 206—56)

This invention relates to a leak-proof variable-volume holder for frozen confections.

More particularly the invention pertains to a disposable cup formed basically of waxed paper or other relatively inexpensive waterproof sheet material, said cup being of a size and shape to embrace and upwardly displaceably hold the lower half (more or less) of a bar of frozen confection, the upper margin of the cup desirably having inturned pointed confection-retaining integral tabs for preventing accidental displacement and loss of the confection bar, the bottom of said cup being upwardly movable by thumb or finger pressure to vary the volume of the container (that is, to feed or move the bar progressively upwardly as the exposed end thereof is eaten), said bottom being (1) in the form of a disc having a guiding and sealing expansible flange, or (2) in the form of a crinkled or corrugated disc deformable sufficiently to permit pushing of the central portion thereof substantially to the upper end of the cup, or (3) in the form of a diaphragm of any suitable stretchable, but not elastic, material, resembling bubble gum in strength and consistency.

It is a principal object of the invention to provide a disposable cup of waxed paper, or other suitable sheet material, for embracing the lower portion of a bar of confection (being placed therearound either during manufacture or immediately prior to consumption), the cup having a movable or deformable liquid-tight bottom engageable by a finger or thumb for progressively lifting the bar as its upper exposed end is eaten.

It is another object to provide a holder of this type having integral inturned bar gripping fingers for preventing accidental loss of the bar from the cup.

Figure 1:
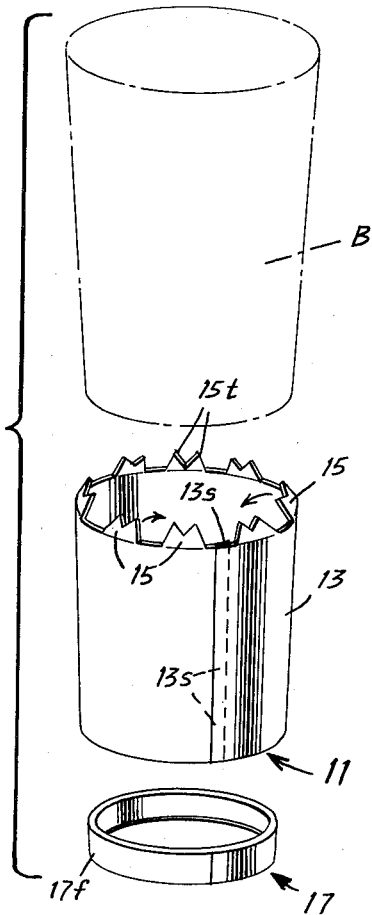
Figure 2:
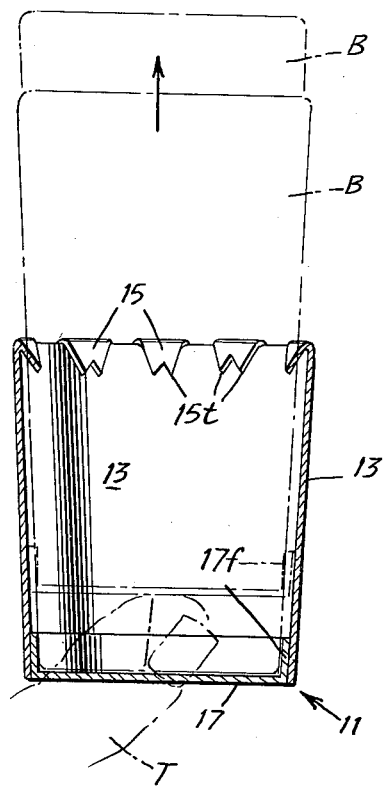
Figure 3:
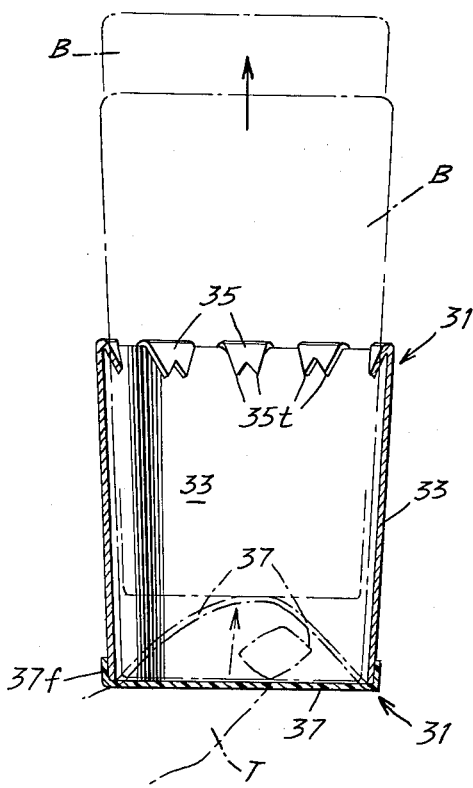
Figure 4:
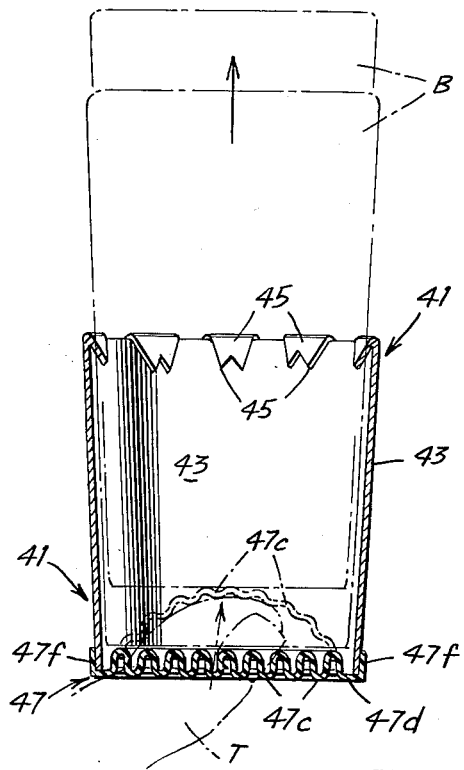
Figure 5:
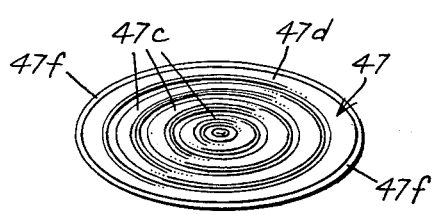

Other and further objects of the invention will become apparent from a reading of the following specification taken in conjunction with the drawings, in which:

FIGURE 1 is an exploded perspective view of a movable bottom form of the invention, FIGURE 2 is an elevational view of the assembled disclosure of FIGURE 1, in vertical axial section, FIGURE 3 is a view similar to FIGURE 2 showing a stretchable bottom species of the invention, FIGURE 4 is a view similar to FIGURES 2 and 3 disclosing another form of the invention in which the bottom is made deformable by concentric corrugation thereof, and FIGURE 5 is a plan view from below, of the species of FIGURE 4.

With reference now to FIGS. 1 and 2 of the drawings, the numeral 11 generally designates a cup embodying the invention. Cup 11 comprises a tubular body member 13 formed of waxed paper or other suitable waterproof sheet material (such as sheet metal or plastic) and having an elliptical or other (circular, square, etc.) horizontal cross section to closely conform to that of the confection bar B to be held thereby. Body 13 may or may not have an overlapped seam 13s, as preferred.

The upper rim of the body 13 is desirably provided with a plurality of circumferentially spaced inturned integral tabs 15, each of which may have formed thereon one or more pointed teeth 15t. Tabs 15 are inwardly and upwardly inclined at an angle that causes them to dig into the sides of the bar B as the latter is inserted into the cup 11 and that thereby causes them to assume the downwardly and inwardly directed angle shown in FIG. 2. The material of the tubular body 13 is sufficiently resilient to bias the tabs 15 toward returning to their initial positions of FIG. 1, thus causing them to continue their digging-in action against the inserted bar B and resulting in a positive holding of the bar in the cup against accidental outward (upward) displacement. The tabs 15 do not penetrate the bar B sufficiently to prevent relatively easy intended upward movement.

The movable bottom member 17 of the cup 11 is in the form of an egg shaped disc (for good shape conformation with half of a now popular frozen confection having two slightly conically tapered parts parallelly and tangentially joined), but obviously other shapes can be chosen: square, elliptical, circular, etc. Bottom member 17 can be die formed of waxed paper, molded plastics, etc., and has an integral upturned flange 17f outwardly flared and constructed for resilient expansion with the inner walls of body 13 so as to insure a liquid-tight seal as the bottom is moved upwardly therein. The expansibility of flange 17f also compensates for the upwardly expanding slight taper in the body 13, which is desirable (1) for better shape conformation with the usually tapered bar B (which facilitates release from its mold), (2) to permit crush-resisting and space-saving cups 11 for storing and shipping, and (3) to facilitate insertion of the smaller end of bar B into the larger end of cup 11 (FIG. 2).

In the species of FIG. 3, the cup 31 is similar to cup 11 (FIGS. 1 and 2) in size, shape and general functioning. Body 33 and tabs 35 correspond to parts 13 and 15, respectively. The bottom member 37, however, differs in being molded of a plastic material that is stretchable but not elastic (in the manner of the familiar bubble gum substances). The integrally upturned flange 37f of bottom 37 sealingly embraces the rim of the lower edge of tubular body 33, being press fitted thereon (or cemented, thermoplastically welded, or otherwise fixed thereto).

Upward pressure by the thumb T (or finger) of the consumer causes a permanent upwardly convex deformation of bottom 37, as shown in FIG. 3. The deformation (phantom shown in FIG. 3) may progress in steps until the last morsel of the bar B is lifted to the mouth of the cup. Since the bottom remains as a deformed but liquid-tight diaphragm, the liquid resulting from melting of a part of the bar B will be retained in the cup for safe disposal or can be drunk before disposal of the cup.

In the species of FIGS. 4 and 5, the cup 41 generally resembles cup 31 of FIG. 3, but with parts 43 and 45 being constructed and functioning like their counterparts in the previously described species. However, the bottom member 47 differs from member 37 in being formed of a deformable material that is not only non-elastic but also not stretchable, such as waxed paper, sheet metal, certain plastics, etc. The deformability of bottom 47 is produced by die-forming the disc portion 47d thereof with concentric (or spiral) corrugations 47c therein. This makes possible the upwardly convex deformation shown in phantom in FIG. 4. The attaching flange 47f serves the same function and is attached in the same manner as flange 37f, above described.

While but certain forms of the invention have been shown and described herein, it will be readily apparent to those skilled in the art that many minor modifications may be made without departing from the spirit of the invention or the scope of the appended claims.

As an example of the disclosed invention, the cups can be packaged engaged over the larger ends of twin edge-joined frozen confection bars. The web joining the bars will be cut away for a distance approximately about two-thirds of the depth of the cups to provide a slot into which the sides of the two cups will be received. The cup bottoms thus will engage against the ends of the bars and about a third of the cup height up from the bottoms thereof, to facilitate cup and bar handling and finger engagement with the bottoms. It is also desirable that the confection bars be molded with axial passages therethrough of the size of a drinking straw to serve the purpose thereof whereby the melted portions of the bars can be sipped through the passages as the bars are eaten at their upper ends.

What is claimed is:

1. A leak-proof variable-volume holder for frozen confections comprising: a frusto-conically shaped body member of liquid impervious material of a size to relatively closely surround at least the lower portion of a bar of frozen confection or the like, inwardly directed bar gripping teeth formed integrally with the upper edge of said body member and constructed and arranged to hold said bar against accidental displacement from said holder but permitting relatively easy upward intended movement thereof, a liquid impervious bottom member for said holder, at least the central portion of said bottom member being upwardly movable in said body member as by thumb or finger pressure thereon, and means providing a continuous liquid-tight seal between said members as said bottom portion is moved upwardly through said body member, said tabs having sufficient resilient flexibility to yield downwardly and outwardly to facilitate insertion of said bar into said holder and to thereafter press bar-retainingly inwardly against said bar as the latter diminishes in cross section from melting and/or due to its downwardly constricting taper if any.

2. Structure according to claim 1, said bottom member being of disc shape and having a vertically disposed flange constructed and arranged for resiliently expansibly engaging the inner walls of said body member for frictional retention thereby in desired elevation therein and for constituting said means for providing said liquid-tight seal therebetween, said flange also serving as a guide means for preventing tilting of said bottom member relative to the axis of said body member.

References Cited in the file of this patent

UNITED STATES PATENTS

| | | |
|---|---|---|
| 654,031 | Smith | July 17, 1900 |
| 1,481,700 | Fatland | Jan. 22, 1935 |
| 2,005,245 | Stover | June 18, 1935 |
| 2,208,744 | Bergerioux | July 23, 1940 |

FOREIGN PATENTS

| | | |
|---|---|---|
| 612,437 | France | Oct. 23, 1926 |